Dec. 15, 1953 — J. E. SWALINKAVICH, JR — 2,662,569
HANDLE FOR HACK SAW BLADES
Filed June 7, 1950
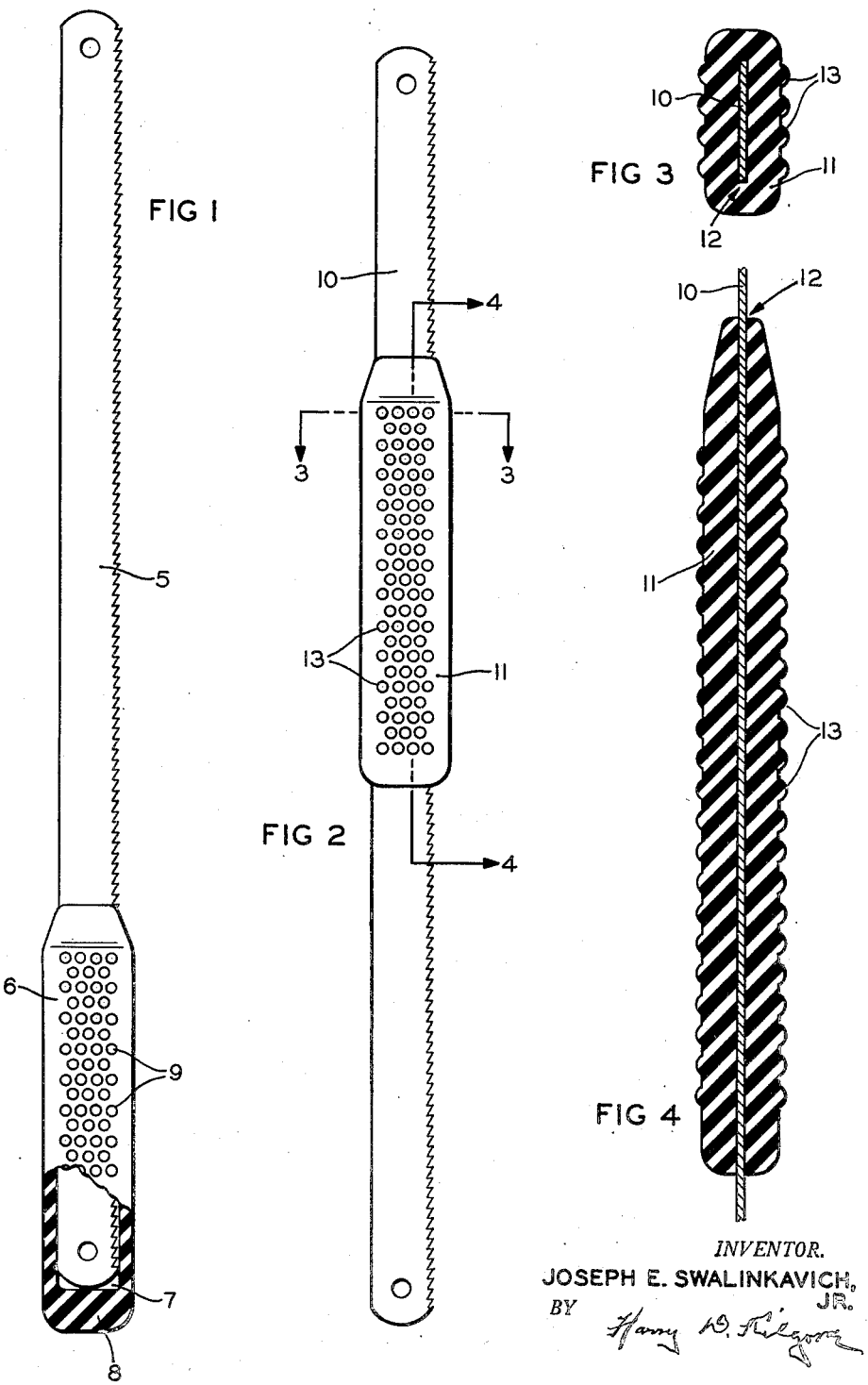
INVENTOR.
JOSEPH E. SWALINKAVICH, JR.
BY
ATTORNEY Patented Dec. 15, 1953

2,662,569

UNITED STATES PATENT OFFICE 2,662,569

HANDLE FOR HACK SAW BLADES

Joseph E. Swalinkavich, Jr., Robbinsdale, Minn.

Application June 7, 1950, Serial No. 166,737

1 Claim. (Cl. 145—108)

My present invention relates to improvements in tool handles and, more particularly, to a novel handle for a hack saw blade.

An object of this invention is to provide a novel handle applicable to a hack saw blade.

Another object of this invention is to provide a novel handle applicable to a hack saw blade in different adjustments to vary the operative length of the blade and held by friction where positioned on the blade.

A still further object of this invention is to provide a flexible handle for a hack saw blade that will bend with the blade when bowed laterally.

Other objects of this invention will be apparent from the following description, reference being had to the drawing.

To the above end, generally stated, the invention consists of the novel construction and arrangement hereinafter described and defined in the claim.

In the accompanying drawing, which illustrates the invention, like characters indicate like parts throughout the several views.

Referring to the drawing:

Fig. 1 is a side elevational view showing one form of the improved handle applied to a hack saw blade, a portion of the handle being broken away and sectioned;

Fig. 2 shows another form of the improved handle applied to a hack saw blade;

Fig. 3 is a view in transverse section taken on the line 3—3 of Fig. 2, on an enlarged scale; and Fig. 4 is a view in longitudinal section taken on the line 4—4 of Fig. 2 on the same scale as Fig. 3.

Referring first to the invention shown in Fig. 1, the numeral 5 indicates a conventional hack saw blade to which one form of the improved handle 6 is applied. This handle 6 is elongated, rectangular in cross-section and formed, as shown, of molded rubber or it may be formed of any other suitable friction material that is preferably flexible.

Extending longitudinally into the handle from the inner end thereof is a passageway 7 that affords a seat for one end portion of the hack saw blade 5. This passageway 7 in cross-section has the same contour as the blade 5 and the size thereof is such that considerable force is required to apply the handle 6 to the blade 5. Friction positively holds the handle 6 on the blade 5 so that there is no relative movement between handle 6 and blade 5.

The outer end of the passageway 7 is closed to afford a stop 8 that limits the endwise movement of the handle 6 onto the blade 5. The longitudinal edge portions of the handle 6 and the outer end portion thereof are rounded and the inner end portion of said handle is beveled to the blade 5.

Molded with the flat sides of the handle 6 is a multiplicity of dot-like bosses 9 that afford non-slip grip surfaces.

Referring now to the invention as shown in Figs. 2, 3 and 4, the hack saw blade is designated by the numeral 10. The handle 11 applied to the blade 10 is identical with the handle 6 except that the passageway 12 extends completely through said handle from end to end. Obviously, the handle 11 may be adjusted longitudinally on the blade 10 to vary the operative length of the blade 10. The dot-like bosses on the handle 11 are designated by the numeral 13. The handle 11 may be bowed with the blade 10 when working in restricted positions.

While the handles 6—11 are shown applied to complete saw blades, they are equally well adapted for application to worn-out or broken saw blades.

Broken or worn out hack saw blades may be ground to form knives or other tools to which the handles 6—11 may be applied.

While the invention has been described as a handle having a tight frictional fit on the blade, it will of course be understood that if the handle has a loose fit with the blade as the result of manufacture or wear from use the handle may nevertheless be positively held where adjusted on the blade by applying squeezing pressure to the flexible handle when in use.

What I claim is:

A narrow, pliable handle for hack saw blades having wide, flat sides, said handle having therein a longitudinal axial passageway that is rectangular in cross section into which the blade may be endwise inserted with a working fit, said handle when gripped while operating the blade, will be squeezed and flex the wide side walls of said handle and press the handle onto the back and the teeth of the blade and thus prevent relative endwise movement of the handle and the blade.

JOSEPH E. SWALINKAVICH, Jr.

References Cited in the file of this patent

UNITED STATES PATENTS

| Number | Name | Date |
|---|---|---|
| 292,148 | Travis | Jan. 15, 1884 |
| 1,726,241 | Schubert | Apr. 27, 1929 |

FOREIGN PATENTS

| Number | Country | Date |
|---|---|---|
| 178,012 | Great Britain | Apr. 13, 1922 |